(12) United States Patent
Han et al.

(10) Patent No.: US 10,626,017 B2
(45) Date of Patent: Apr. 21, 2020

(54) METHOD FOR SYNTHESIZING ALUMINUM NITRIDE AND ALUMINUM NITRIDE-BASED COMPOSITE MATERIAL

(71) Applicant: Research Cooperation Foundation of Yeungnam University, Gyeongsan-si, Gyeongsangbuk-do (KR)

(72) Inventors: Kwan Hee Han, Gyeongsan-si (KR); Ju Hyun Kim, Daegu (KR)

(73) Assignee: Research Cooperation Foundation of Yeungnam University, Gyeongsan-si, Gyeongsangbuk-do (KR)

(*) Notice: Subject to any disclaimer, the term of this patent is extended or adjusted under 35 U.S.C. 154(b) by 0 days.

(21) Appl. No.: 16/065,131

(22) PCT Filed: Nov. 29, 2016

(86) PCT No.: PCT/KR2016/013892
§ 371 (c)(1),
(2) Date: Jun. 22, 2018

(87) PCT Pub. No.: WO2017/111334
PCT Pub. Date: Jun. 29, 2017

(65) Prior Publication Data
US 2019/0010053 A1  Jan. 10, 2019

(30) Foreign Application Priority Data

Dec. 24, 2015 (KR) .................. 10-2015-0186490

(51) Int. Cl.
*C01B 21/072* (2006.01)
*B22F 9/22* (2006.01)
(Continued)

(52) U.S. Cl.
CPC .......... *C01B 21/072* (2013.01); *B22F 1/0059* (2013.01); *B22F 9/22* (2013.01);
(Continued)

(58) Field of Classification Search
None
See application file for complete search history.

(56) References Cited

U.S. PATENT DOCUMENTS 5,837,633 A  11/1998  Toriyama et al.
6,159,439 A  12/2000  Miura et al.
(Continued)

FOREIGN PATENT DOCUMENTS

CN  1275527 A  12/2000
JP  09-183662 A  7/1997
(Continued)

OTHER PUBLICATIONS

International Search Report for PCT/KR2016/013892 dated Mar. 8, 2017 from Korean Intellectual Property Office.
Kim, Joo Hyun, "Synthesis on Aluminum Nitride-(Ni—Al) Intermetallic Compound Composites by Combustion Reaction", Graduate School of Yeungnam University, Thesis Paper of Materials Science & Engineering, Feb. 2015, pp. 1-84.
(Continued)

*Primary Examiner* — Guinever S Gregorio
(74) *Attorney, Agent, or Firm* — Revolution IP, PLLC

(57) ABSTRACT

A method of synthesizing aluminum nitride, the method includes: preparing mixed powder containing 0.5 to 8 wt % of zinc powder, 0.01 to 2 wt % of magnesium powder, 0.01 to 1 wt % of silicon powder, 0.01 to 1 wt % of copper powder, and a balanced amount of aluminum powder; preparing a feedstock of the mixed powder blended and filled with thermoplastic organic binder, by pressured kneading the mixed powder and the thermoplastic organic binder; forming granules of the feedstock by crushing the feedstock or forming a molded body of the feedstock via a powder molding method; and debinding the granules or the molded body by heating under a nitrogen gas atmosphere, and then performing direct nitridation between aluminum and a nitrogen gas at a temperature higher than a debinding temperature.

8 Claims, 6 Drawing Sheets

(51) Int. Cl.
*B22F 1/00* (2006.01)
*C22C 29/16* (2006.01)

(52) U.S. Cl.
CPC ... *B22F 2001/0066* (2013.01); *B22F 2201/02* (2013.01); *B22F 2301/052* (2013.01); *B22F 2301/058* (2013.01); *B22F 2301/10* (2013.01); *B22F 2301/30* (2013.01); *B22F 2302/256* (2013.01); *B22F 2304/058* (2013.01); *B22F 2304/10* (2013.01); *C01P 2002/72* (2013.01); *C01P 2004/03* (2013.01); *C01P 2004/61* (2013.01); *C01P 2004/62* (2013.01); *C22C 29/16* (2013.01)

(56) References Cited

U.S. PATENT DOCUMENTS

| | | | | |
|---|---|---|---|---|
| 6,823,928 | B2* | 11/2004 | Sercombe | B22F 3/26 164/97 |
| 7,022,301 | B2 | 4/2006 | Miura et al. | |
| 2003/0099590 | A1 | 5/2003 | Miura et al. | |
| 2018/0304373 | A1* | 10/2018 | Han | B22F 3/12 |

FOREIGN PATENT DOCUMENTS

| | | |
|---|---|---|
| JP | 10-185440 A | 7/1998 |
| KR | 10-0303122 B1 | 4/2002 |
| KR | 10-1659700 B1 | 9/2016 |

OTHER PUBLICATIONS

P. Sthapitanonda, J. L. Margrave, "Kinetics of Nitridation of Magnesium and Aluminum", J. Phys. Chem., vol. 60 (1956), pp. 1628-1633.

Dian Zhang et al., "Formation of Core-shell and Tadpole-like Structure in the Direct Nitridation of Aluminum Powder by N2 and NH3", Journal of Alloys and Compounds, vol. 547 (2013) pp. 91-99.

T. Okada et al., "Direct Nitridation of Aluminum Complexes at Low Temperature" Journal of Materials Science, vol. 38 (2000) pp. 3105-3111.

M. Uda et al., "Preparation of Mixed Ultrafine (Al-AlN) Powders and Their Nitridation", in Physical Chemistry of Powder Metals Production and Processing, pp. 261-269, Oct. 1989, The Minerals, Metals & Materials Society, PA, U.S.A.

* cited by examiner

[Fig. 1]
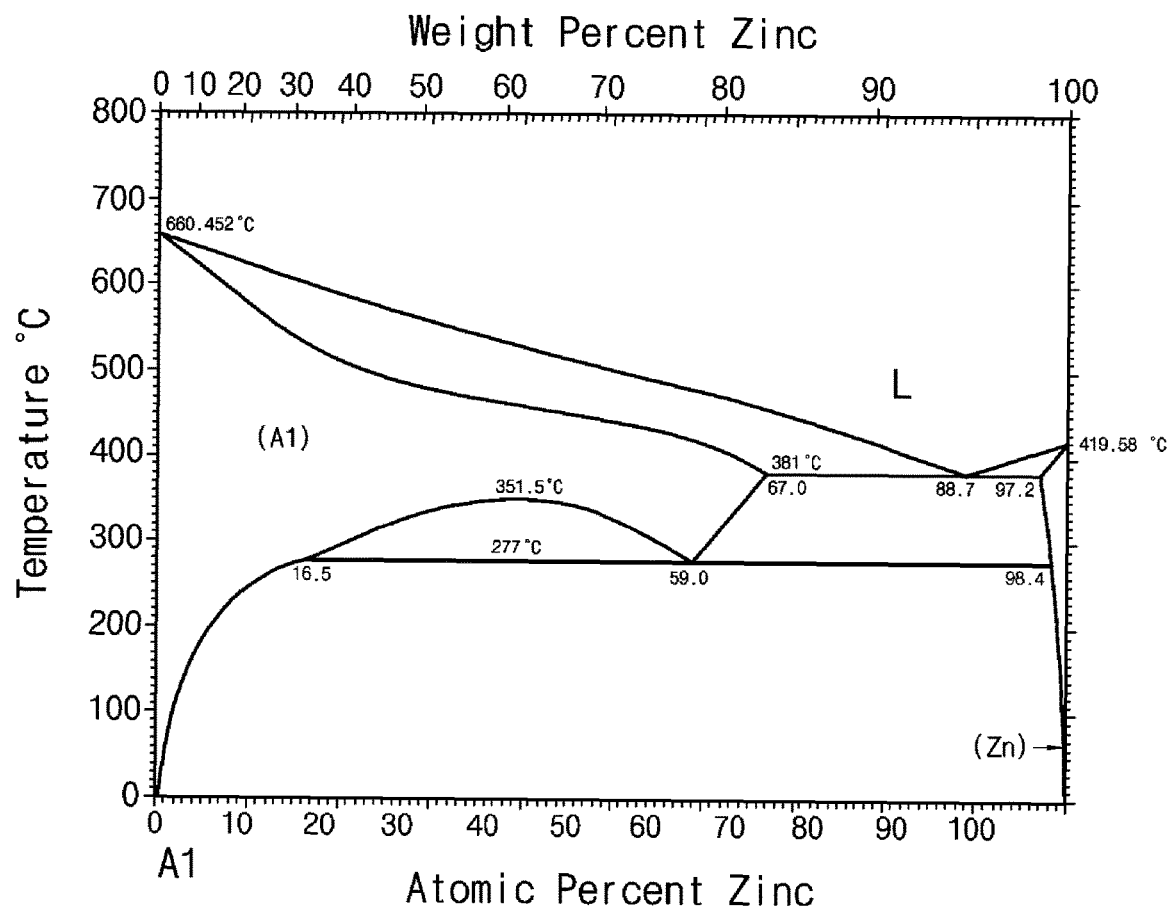
[Fig. 2]
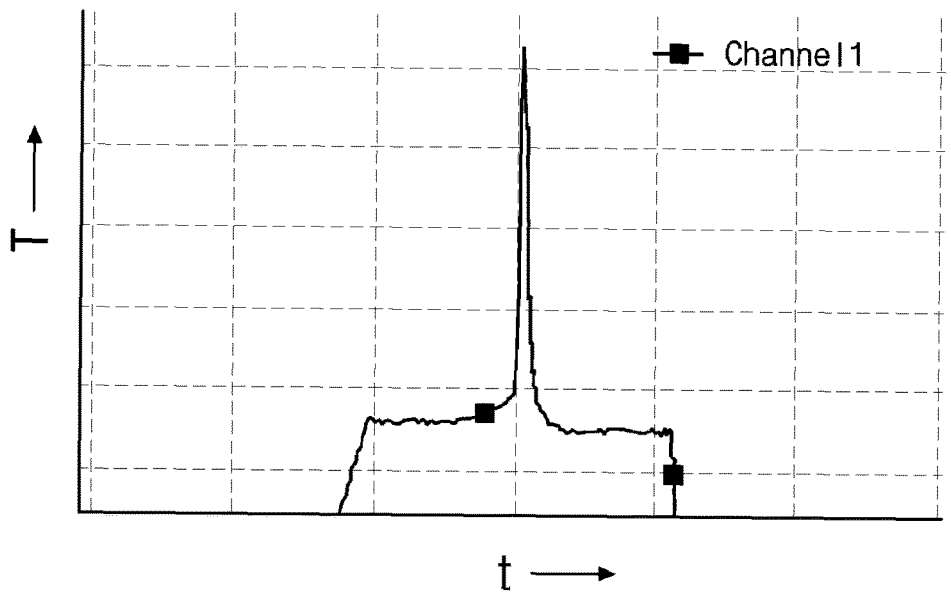

[Fig. 3]
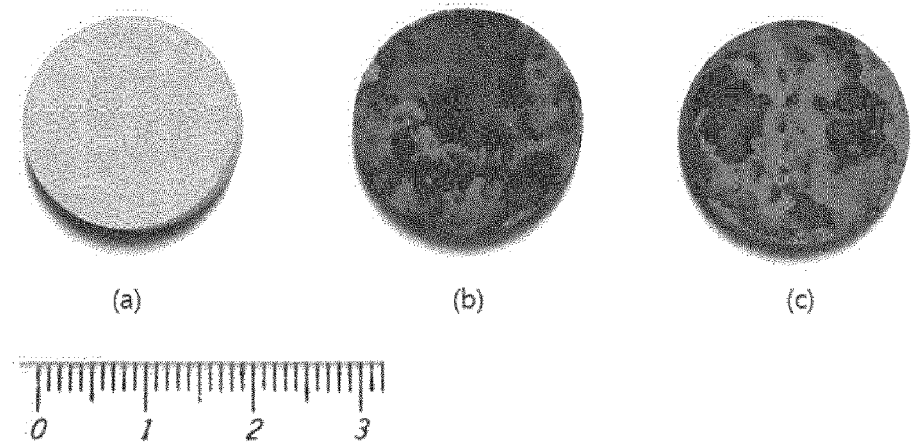
(a)　　　　　(b)　　　　　(c)
[Fig. 4a]
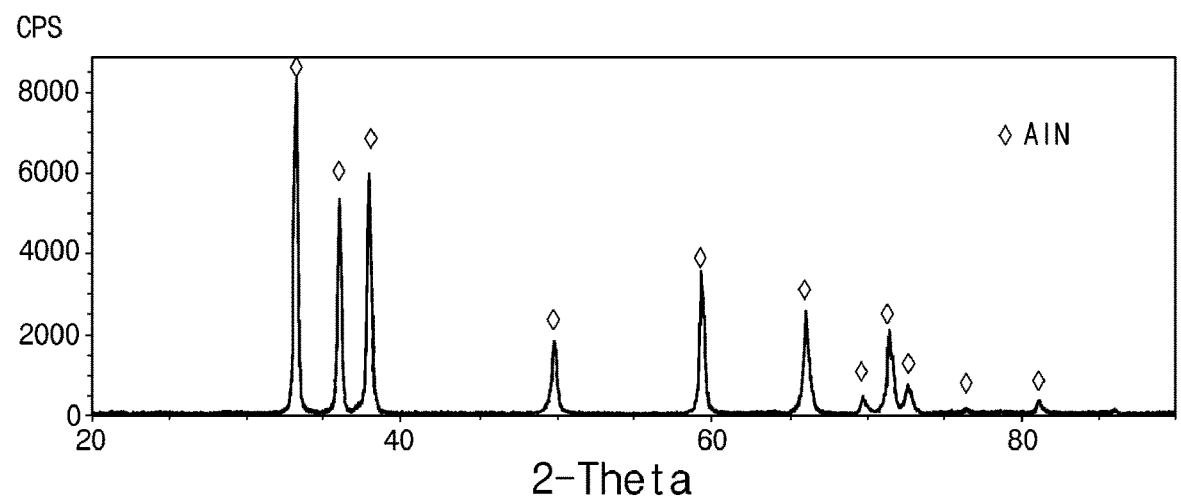
[Fig. 4b]
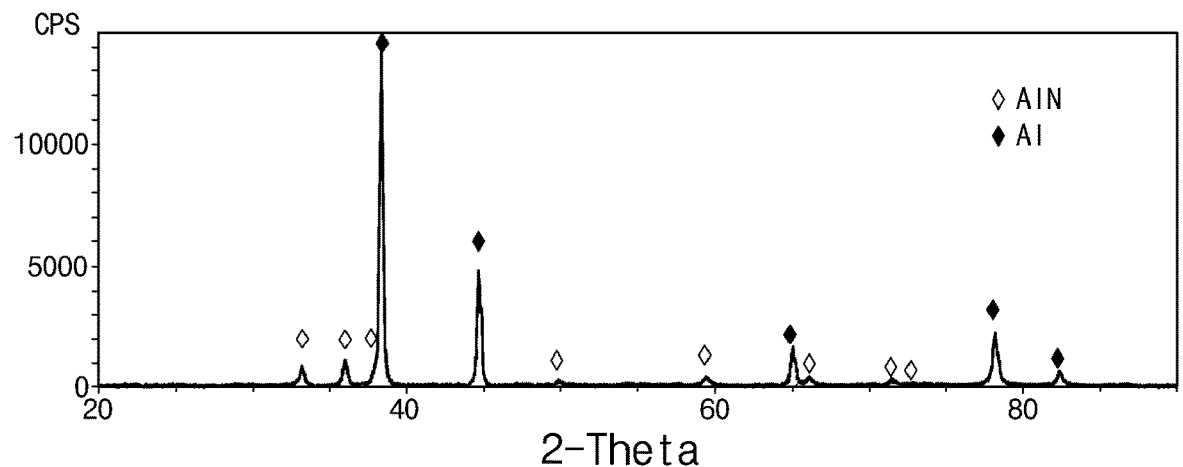

[Fig. 4c]
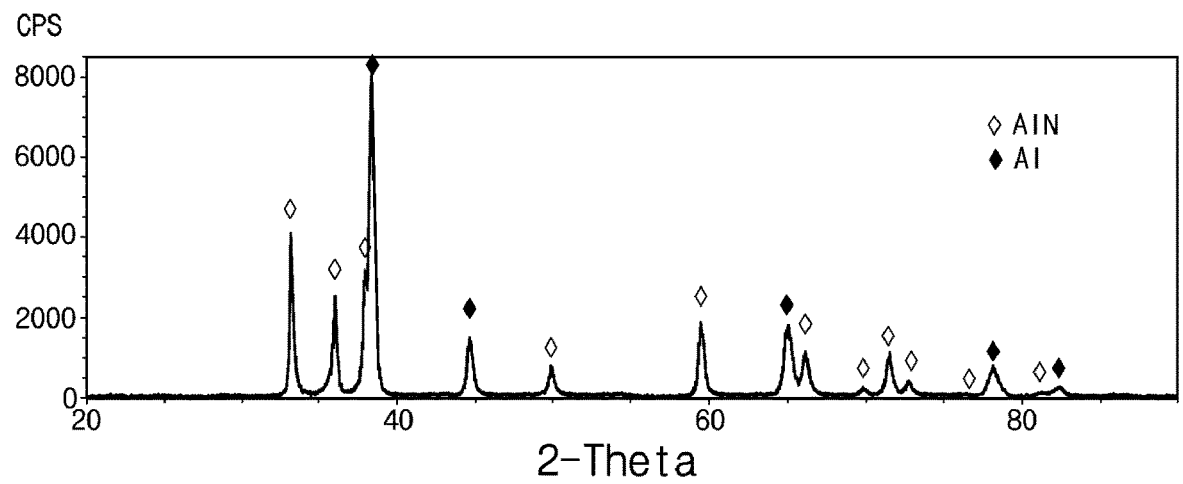
[Fig. 4d]
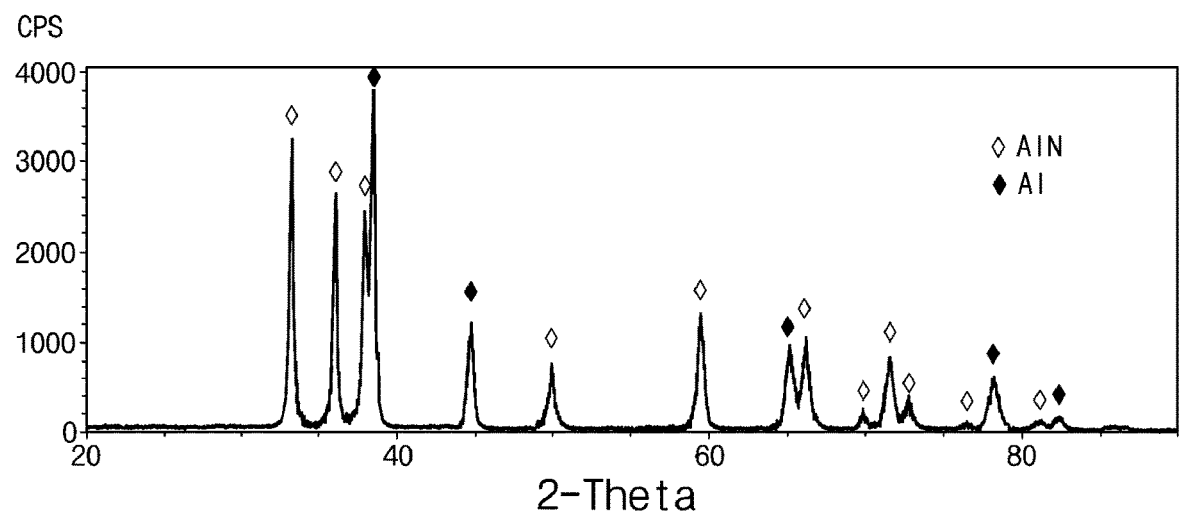

[Fig. 5a]
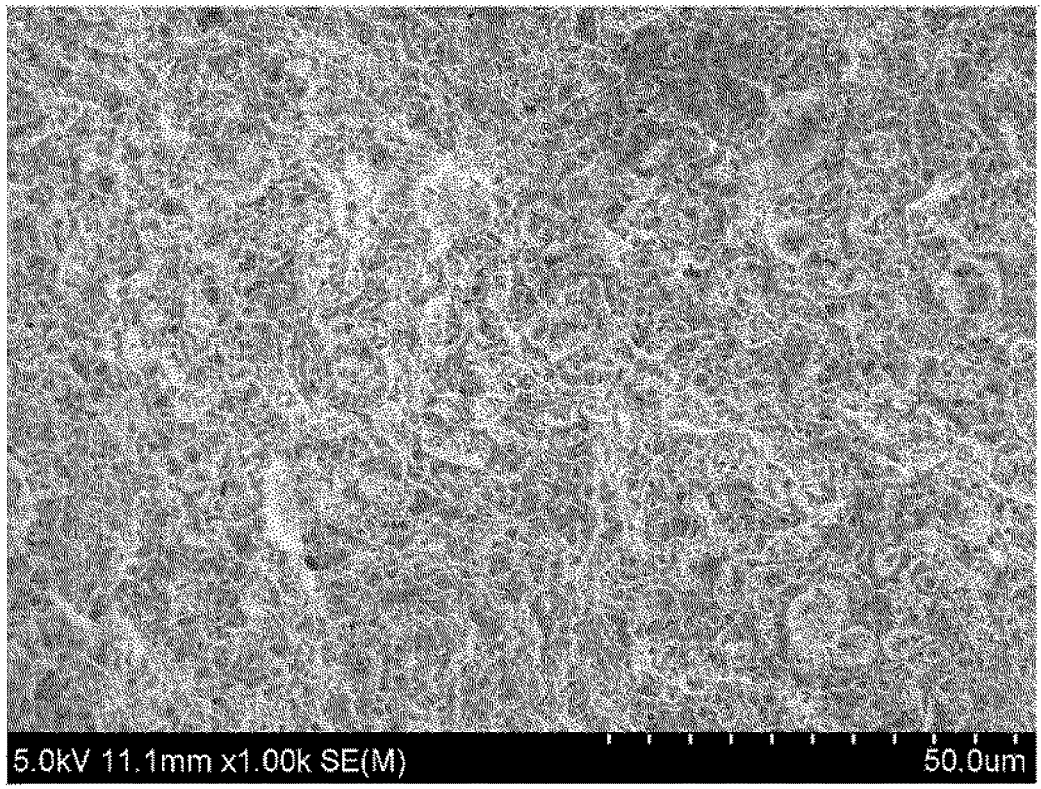
[Fig. 5b]
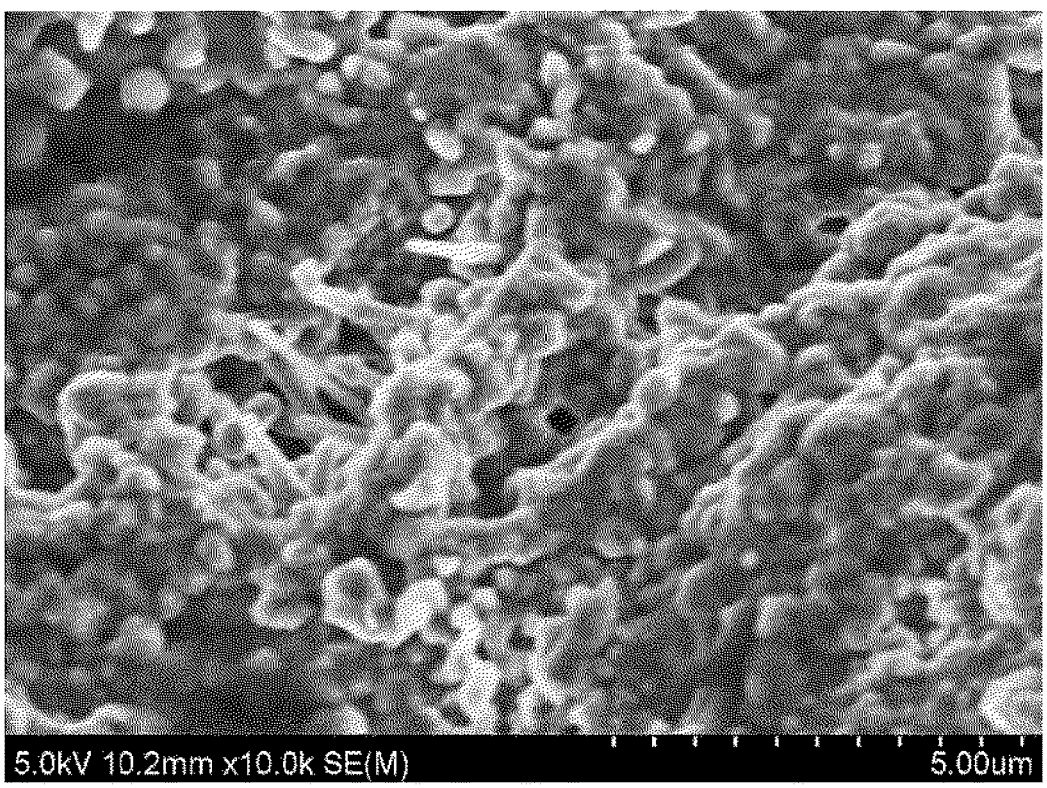

[Fig. 6a]
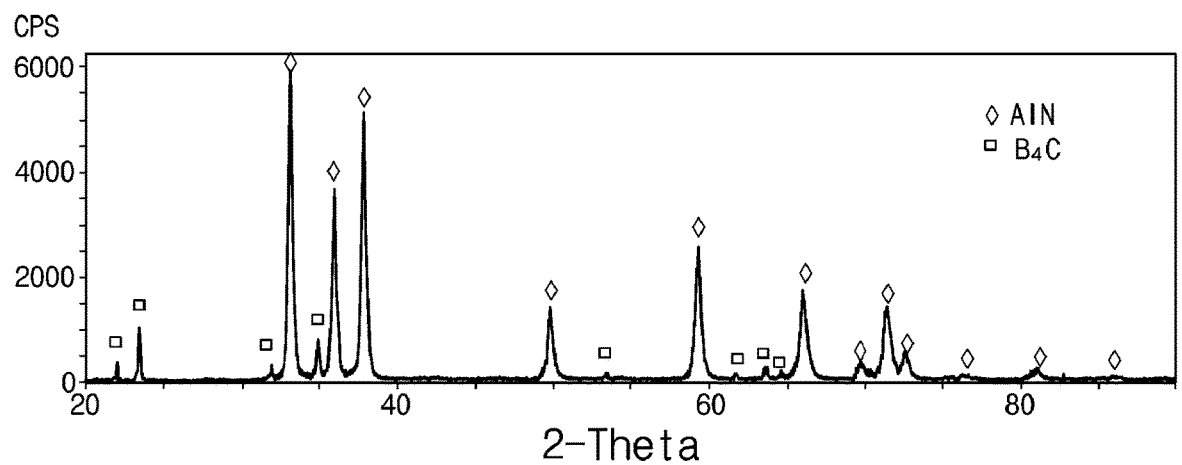
[Fig. 6b]
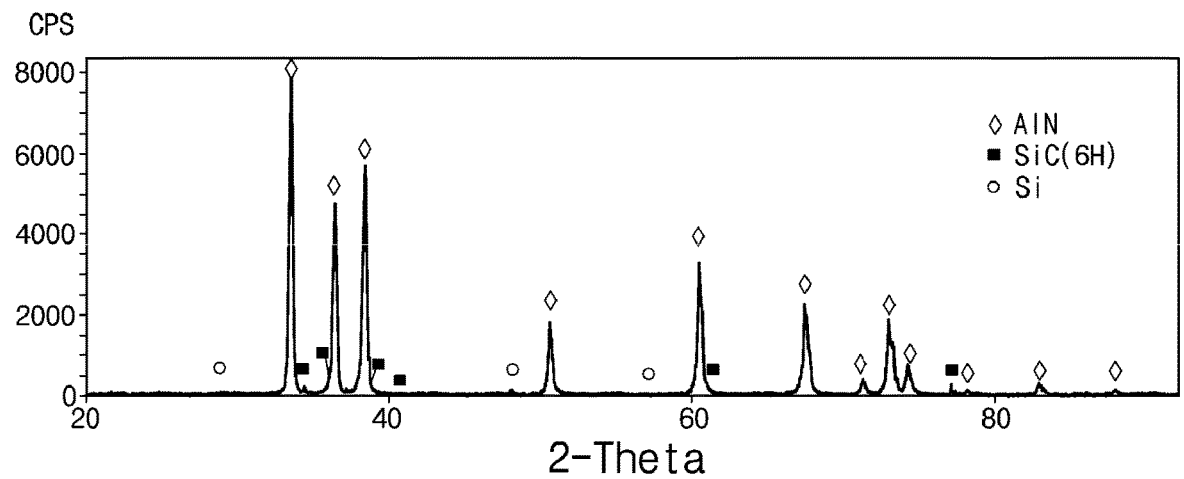

[Fig. 6c]
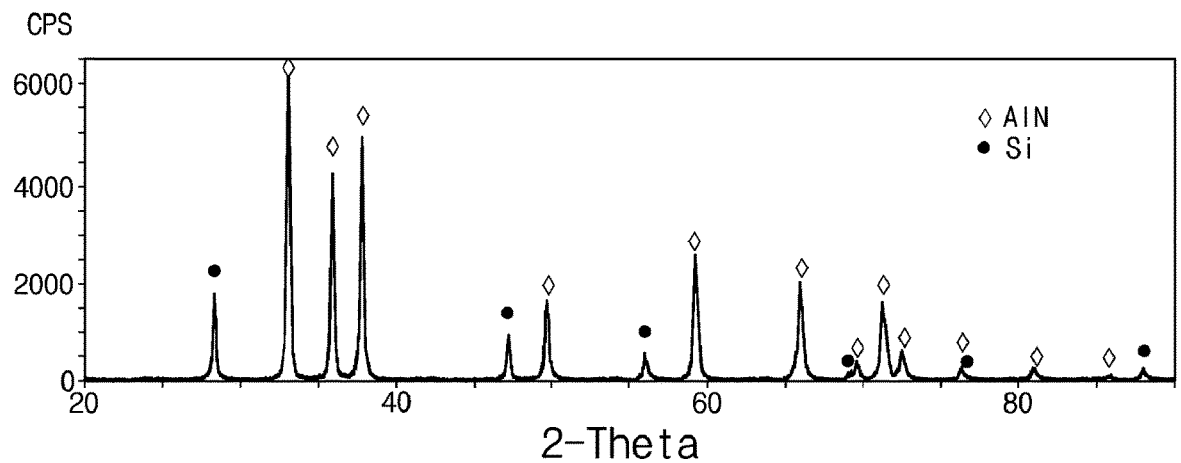
[Fig. 6d]
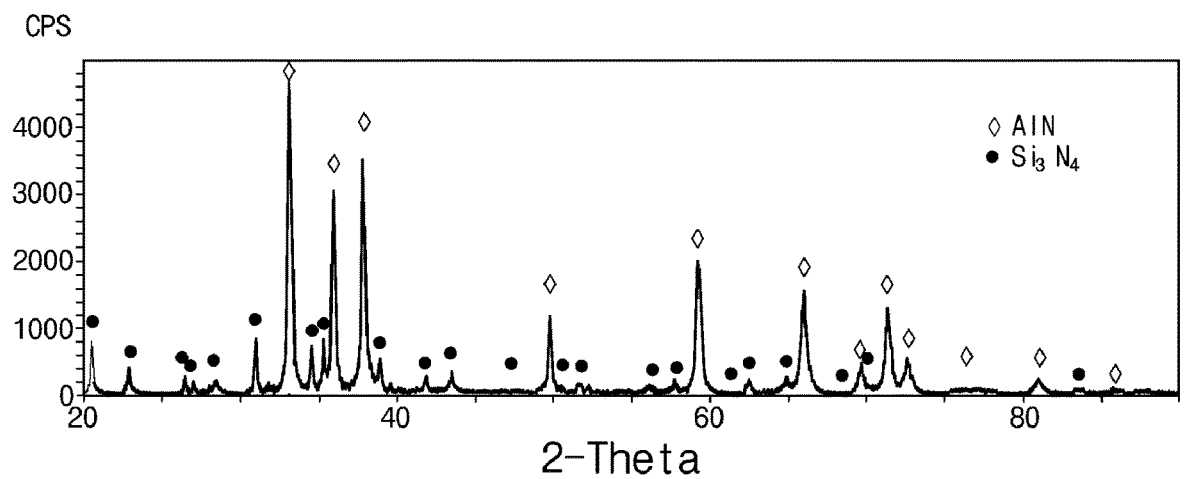

METHOD FOR SYNTHESIZING ALUMINUM NITRIDE AND ALUMINUM NITRIDE-BASED COMPOSITE MATERIAL

TECHNICAL FIELD

The present disclosure relates to a method of synthesizing aluminum nitride or aluminum nitride-based composite material, in which other inorganic phase coexists with aluminum nitride matrix, and belongs to a field of materials industry.

BACKGROUND ART

Aluminum nitride has excellent mechanical properties, such as high hardness, a high elastic modulus and high stiffness, and also has excellent thermal and electric properties as a printed circuit board or a heat dissipation material, such as high thermal conductivity and a low thermal expansion coefficient while being electrically nonconductive. Accordingly, aluminum nitride is a compound drawing large attention in various industrial fields including electronic industries, as a hard material or a material for a part of semiconductor device processing equipment, and as a thermal management material.

As methods of synthesizing aluminum nitride, a method of synthesizing aluminum nitride by mixing aluminum oxide and carbon and heating the mixture thereof at a high temperature of 1,800° C. under a nitrogen gas atmosphere to induce reduction of aluminum oxide by carbon and a subsequent nitridation reaction between the reduced aluminum and a nitrogen gas (known as a carbo-thermal method), and a direct nitridation method in which aluminum powder and a nitrogen gas are reacted at a high temperature (known as a direct nitridation method) are industrially widely used. The present disclosure relates to a method of synthesizing aluminum nitride via a nitridation reaction of aluminum powder and a nitrogen gas.

According to a preceding study (P. Sthapitanonda, J. L. Margrave, "Kinetics of Nitridation of Magnesium and Aluminum", J. Phys. Chem., vol. 60 (1956), pp 1628-1633), once a nitride layer is formed on a surface of aluminum powder at a low temperature, a rate of a subsequent nitridation reaction is controlled by diffusion of a reactant, and reaction kinetics of formation of nitride follows a parabolic law. In this regard, although formation of nitride may occur at a high rate in the earlier stage, once a core-shell structure where solid-phase un-reacted aluminum is covered with nitride is formed, the rate of formation of nitride decreases with time, and thus only a limited amount of nitride may be formed.

Therefore, for efficient nitridation, the nitridation reaction must proceed as a rapid combustion reaction rather than a reaction controlled by diffusion. One approach is a self-propagating high temperature combustion synthesis method, in which a part of an aluminum powder stack is intensively heated using an ignitor to initiate a rapid nitridation reaction and generate a large amount of exothermic heat, such that un-reacted aluminum continues to produce a high temperature exothermic synthesis reaction. Another approach is a volumetric thermal explosion method in which aluminum powder stack or porous aluminum powder compact is heated under a nitrogen gas atmosphere to cause volumetric combustion synthesis in a thermally explosive mode involving high reaction heat generation, so that a nitridation reaction of aluminum powder occurs almost simultaneously.

The present disclosure relates to a method of synthesizing aluminum nitride by the volumetric combustion synthesis, the latter method between the two types of combustion synthesis methods as introduced above.

According to the experimental results in a reference by Dian Zhang et al. ("Formation of Core-shell and Tadpole-like Structure in the Direct Nitridation of Aluminum Powder by $N_2$ and $NH_3$", Journal of Alloys and Compounds, vol. 547 (2013) pp 91-99), when pure aluminum powder having a particle diameter of 53 to 120 μm is heated under a nitrogen gas atmosphere, the powder is all converted to aluminum nitride at a temperature of 1,400° C. or higher. Industrially, in order to obtain an aluminum nitride product without any residual aluminum via the direct nitridation method using a nitrogen gas, it is reported that a reaction must be performed at a high temperature of about 1,500° C.

Hereinafter, prior arts published in relation to synthesis of aluminum nitride via the direct nitridation method will be reviewed briefly.

U.S. Pat. No. 5,837,633 disclosed that aluminum nitride can be synthesized even at a low temperature of 550 to 660° C. when a formed body, in which 0.16 g of aluminum powder is pressed to a thickness of 0.75 mm and a diameter of 12 mm, or 6 g of aluminum powder is packed in a depth of 1 cm in a graphite tray having a length of 3 cm and a width and pressurized to 10 to 100 atmospheres with a nitrogen gas.

Okada et al. (T. Okada et al., "Direct Nitridation of Aluminum Complexes at Low Temperature," Journal of Materials Science, vol. 38 (2000) pp. 3105-3111.) studied a nitridation reaction of a disc having a diameter of 12 mm and a thickness of 0.8 mm and with a relative density of about 65%, formed using aluminum powder with an average particle diameter of 24 μm, which occurs on heating the disc to 500 to 700° C. under a pressurized nitrogen gas atmosphere of 0.5 to 7 MPa after charging it into a furnace. It was reported that the aluminum was fully converted into aluminum nitride when a sample was pre-heated to 580° C. in vacuum prior to nitridation, and then nitridation-treated at nitrogen gas pressure of 4 MPa.

U.S. Pat. No. 6,159,439 discloses a method of synthesizing aluminum nitride by heating, at a temperature of 500 to 1,000° C. under a nitrogen gas atmosphere, a powder mixture containing 50 to 97 wt % of aluminum powder and 3 to 50 wt % of a nitridation promoting element including no more than 0.5 wt % of magnesium or an aluminum alloy thereof (for example, Al—Mg), based on total 100 wt % of the powder mixture. Here, coarse aluminum powder having a particle size of 210 μm or more is used, and finer powder of a magnesium-containing element or Al—Mg powder mixture is used as the nitridation promoting agent. Also, U.S. Pat. No. 6,159,439 discloses a method of performing nitridation treatment at a temperature lower than the melting point of aluminum, and then performing nitridation treatment again at a high temperature equal to or higher than 750° C.

A method of adding fine aluminum nitride powder to raw material of the reaction, which does not participate in the nitridation reaction of aluminum powder, may also be used to promote nitridation of aluminum powder via the combustion synthesis reaction in the thermally explosive mode. Here, the added aluminum nitride powder absorbs heat generated during the nitridation, thereby suppressing overheating and lowering a temperature of nitride formation. As a result, agglomeration of the aluminum powder is prevented, and the nitridation is enhanced. (M. Uda et al., "Preparation of Mixed Ultrafine (Al—AlN) Powders and Their Nitridation", in Physical Chemistry of Powder Metals Production and Processing, pp. 261-269, October 1989, The Minerals, Metals & Materials Society, PA, U.S.A)

In U.S. Patent Application No. 2003/0099590 and U.S. Pat. No. 7,022,301, Miura et al. disclose a method of synthesizing aluminum nitride by heating a mixture of aluminum powder having an average particle size of 10 to 200 μm and home-made −100 mesh aluminum nitride powder at 460° C. for at least 10 minutes to form aluminum nitride on a surface of the aluminum powder, and then inducing nitridation of un-reacted aluminum at 500 to 1,000° C. under a nitrogen gas atmosphere pressurized to 80 to 300 kPa.

As described above, in order to synthesize aluminum nitride via direct nitridation by using aluminum powder as raw material powder, a method of admixing aluminum nitride has been used and to synthesize nitride a nitrogen gas atmosphere higher than atmospheric pressure has been used.

DESCRIPTION OF EMBODIMENTS

Technical Problem

As described above, in order to synthesize aluminum nitride via direct nitridation of aluminum powder in a loosely packed or porous aluminum body, agglomeration or sintering among aluminum powder needs be prevented during heating, and for complete conversion of aluminum powder to aluminum nitride, it is important to retain a smooth channel for supplying a nitrogen gas.

In the prior art, to resolve the issues described above, aluminum powder having a large particle diameter is used, a nitride layer is pre-formed on a surface of aluminum powder via a nitriding reaction at a low temperature, or aluminum nitride is added, thereby separating aluminum powder and preventing agglomeration or sintering of the aluminum powder.

Also in the prior art, aluminum powder is efficiently converted to aluminum nitride by inducing a nitridation reaction under a nitrogen gas atmosphere higher than atmospheric pressure, by using a high pressure chamber.

The present disclosure proposes an efficient and convenient method of synthesizing aluminum nitride by a nitriding reaction of aluminum powder at a low temperature of 800° C. or lower, by using a nitrogen gas under atmospheric pressure. Thus, according to the present disclosure, a special facility, such as a separately designed high pressure reaction chamber, is not required, and thus aluminum nitride ceramic may be conveniently and economically synthesized.

Another aspect of the present disclosure is to provide a method of synthesizing an aluminum nitride-based composite material containing at least 50 wt % of aluminum nitride, by using a porous aluminum body in a nitrogen gas under atmospheric pressure.

Solution to Problem

In the present disclosure, in order to promote a nitridation reaction of aluminum powder, mixed powder including aluminum, highly volatile elements with low melting points, such as zinc and magnesium, and small amounts of silicon and copper is used as an elemental component, and further, in order to avoid contact among aluminum powder, which may cause agglomeration of the aluminum powder, the mixed powder is kneaded with a large amount of an organic binder, which may be removed via evaporation or thermal degradation during a subsequent heating process, to be used as a feedstock.

According to an aspect of the present disclosure, there is provided a method of synthesizing aluminum nitride, the method including: preparing mixed powder containing 0.5 to 8 wt % of zinc powder, 0.01 to 2 wt % of magnesium powder, 0.01 to 1 wt % of silicon powder, 0.01 to 1 wt % of copper powder, and a balanced amount of aluminum powder; preparing a feedstock composed of the mixed powder and a thermoplastic organic binder, by pressurized kneading the mixed powder and the thermoplastic organic binder; forming granules of the feedstock by crushing the feedstock or forming a molded body of the feedstock via a powder molding method; and debinding the granules or the molded body via heating under a nitrogen gas atmosphere, and then performing direct nitridation reaction between aluminum and a nitrogen gas at a temperature higher than a debinding temperature.

According to another aspect of the present disclosure, there is provided a method of synthesizing an aluminum nitride-based composite material, the method including: further adding, in the preparing of the mixed powder, 0.1 to 10 wt % of at least one element selected from the group consisting of lithium, calcium, phosphorous, gadolinium, iron, nickel, cobalt, manganese, silver, chromium, zirconium, strontium, molybdenum, tungsten, and alloys thereof to the mixed powder to obtain 100 wt % of a powder mixture.

According to another aspect of the present disclosure, a method of synthesizing an aluminum nitride-based ceramic composite material, the method including: further adding, in the preparing of the mixed powder, 0.1 to 50 wt % of at least one inorganic material selected from the group consisting of alumina, silica, zirconia, yttria ($Y_2O_3$), calcium oxide (CaO), aluminum nitride, silicon carbide, boron carbide ($B_4C$), silicon nitride ($Si_3N_4$), WC, MoC, $TiB_2$, TiC, TiN, h-BN, c-BN, diamond, carbon nanotube, and graphene to the mixed powder to obtain 100 wt % of a powder mixture.

According to another aspect of the present disclosure, there is provided aluminum nitride, an aluminum nitride-based composite material, or an aluminum nitride-based ceramic composite material synthesized by the method above.

Advantageous Effects of Disclosure

In the prior arts, in order to synthesize aluminum nitride via a nitridation reaction between aluminum powder and a nitrogen gas, a special facility equipped with a high pressure reaction chamber had to be used to provide a reaction environment having nitrogen gas pressure higher than atmospheric pressure and a high temperature equal to or higher than 1,400° C.

Also, a method of avoiding direct contact among aluminum powder by adding aluminum nitride powder was used to prevent supply of a nitrogen gas, i.e., a reaction gas, from being blocked due to agglomeration or sintering of aluminum powder during heating under a nitrogen gas atmosphere.

However, according to the present disclosure, aluminum nitride can be synthesized from aluminum powder at a low temperature of 800° C. or below under atmospheric pressure and without addition of aluminum nitride powder. Accordingly, aluminum nitride can be economically synthesized at low costs, since the present disclosure does not require a special equipment, such as a high pressure reaction equipment, and addition of aluminum nitride powder.

In particular, since the present disclosure utilizes a thermoplastic organic binder to prepare porous aluminum powder body, a molded body having a specific shape can be prepared via a suitable powder molding process and, as a result, an aluminum nitride molded body having a desired shape as a porous body can be prepared.

In addition, the present disclosure provides a method of synthesizing an aluminum nitride-based composite material by incorporating, to aluminum powder, powder containing at least one selected from the group consisting of lithium, calcium, phosphorous, gadolinium, iron, nickel, cobalt, manganese, silver, chromium, zirconium, strontium, molybdenum, tungsten, and alloys thereof in an amount of 0.1 and 10 wt % based on 100 wt % of such admixed powder.

Further, by inducing a nitridation reaction via incorporation of an inorganic material selected from the group consisting of alumina, silica, zirconia, yttria ($Y_2O_3$), calcium oxide (CaO), aluminum nitride, silicon carbide, boron carbide, silicon nitride ($Si_3N_4$), WC, MoC, $TiB_2$, TiC, TiN, h-BN, c-BN, diamond, carbon nanotube, and graphene to aluminum powder mixture, a composite material comprising the said inorganic material and aluminum nitride can be synthesized.

As such, a method of synthesizing aluminum nitride via a reaction of aluminum powder with a nitrogen gas at a low temperature, according to the present disclosure, is a new manufacturing method and thus has riffle effects of providing a new manufacturing technology having high technical, economical, and eco-friendly values.

BRIEF DESCRIPTION OF DRAWINGS

FIG. 1 is a binary equilibrium phase diagram of aluminum-zinc.

FIG. 2 is a graph showing a change of temperatures in the vicinity of a specimen during the sintering process FIG. 3 shows perspective views of a compression molded body before thermal treatment and after sintering: (a) as-molded, (b) sintered at 630° C., and (c) sintered at 700° C., respectively.

FIG. 4a shows an X-ray diffraction pattern of a specimen prepared by sintering a molded body under a nitrogen gas atmosphere, the molded body manufactured using a feedstock containing mixed powder of Al-4 wt % Zn-1 wt % Mg-0.25 wt % Cu.

FIG. 4b shows an X-ray diffraction pattern of a specimen prepared by sintering a molded body under a nitrogen gas atmosphere, the molded body manufactured using a feedstock containing only fine aluminum powder having an average particle size of 5 μm.

FIG. 4c shows an X-ray diffraction pattern of a specimen prepared by sintering a molded body under a nitrogen gas atmosphere, the molded body manufactured using a feedstock containing blended powder of Al-4 wt % Zn.

FIG. 4d shows an X-ray diffraction pattern of a specimen prepared by sintering a molded body under a nitrogen gas atmosphere, the molded body manufactured using a feedstock containing only coarse aluminum powder of a −325 mesh (US Standard mesh number) size.

FIGS. 5a and 5b show images of a fractured surface of a porous aluminum nitride sintered body observed under a scanning electron microscope: (5a) a low magnification (×1,000) and (5b) a high magnification (×10,000).

FIG. 6a shows an X-ray diffraction pattern of a specimen prepared by sintering a molded body under a nitrogen gas atmosphere, the molded body manufactured using a feedstock containing 60 parts by weight of mixed powder of Al-4 wt % Zn-1 wt % Mg-0.25 wt % Si-0.1 wt % Cu and 40 parts by weight of boron carbide.

FIG. 6b shows an X-ray diffraction pattern of a specimen prepared by sintering a molded body under a nitrogen gas atmosphere, the molded body manufactured using a feedstock containing 90 parts by weight of mixed powder of Al-4 wt % Zn-1 wt % Mg-0.25 wt % Si-0.1 wt % Cu and 10 parts by weight of silicon carbide.

FIG. 6c shows an X-ray diffraction pattern of a specimen prepared by sintering a molded body under a nitrogen gas atmosphere, the molded body manufactured using a feedstock containing 90 parts by weight of mixed powder of Al-4 wt % Zn-1 wt % Mg-0.25 wt % Si-0.1 wt % Cu and 10 parts by weight of silicon.

FIG. 6d shows an X-ray diffraction pattern of a specimen prepared by sintering a molded body under a nitrogen gas atmosphere, the molded body manufactured using a feedstock containing 70 parts by weight of mixed powder of Al-4 wt % Zn-1 wt % Mg-0.25 wt % Si-0.1 wt % Cu and 30 parts by weight of silicon nitride.

BEST MODE

Hereinafter, the present disclosure will be described in detail.

As described above, in order to synthesize aluminum nitride at a low temperature via a direct reaction between aluminum powder and a nitrogen gas under atmospheric pressure, a combustion reaction in a thermal explosion mode, which occurs violently when particles of the aluminum powder almost simultaneously participate in nitridation reaction, is used instead of a diffusion-controlled nitridation reaction, in which nitride formation is occurred from the surface of the aluminum powder and proceeds to the interior of aluminum powder by the penetration of a nitrogen gas. In order to facilitate the nitridation reaction in a thermal explosion mode, it is advantageous to use fine aluminum powder having a large contact area with a reaction gas of nitrogen gas and high activity, as possible, i.e., an aluminum powder having a large specific surface area.

In order to induce the nitridation reaction in the thermal explosion mode between the aluminum powder and the nitrogen gas, a loosely packed molded body of the aluminum powder is used, limiting a chance of direct contact among the aluminum powder. In this regard, the present disclosure uses, as a raw material, a feedstock prepared by pressurized kneading the aluminum powder with a large amount of a wax-based organic binder.

In other words, according to the present invention, a feedstock having a volume ratio of the aluminum powder to the organic binder, ranging from 1:4 to 4:6 is used as a raw material, and the feedstock may be crushed into granules or, when required, suitably formed into a molded body via a powder molding method, such as low pressure casting, injection molding, warm extrusion molding, or warm compression molding, to be used.

In a subsequent debinding process, the granules or molded body of the feedstock are heated under a nitrogen gas atmosphere to remove the organic binder, so as to produce a porous body of the aluminum powder. Since the debinding process is performed in a nitrogen gas, slight nitridation occurs in the later stage of the debinding process.

A nitridation treatment is performed on such a debound body under a nitrogen gas atmosphere at atmospheric pressure and at an elevated temperature ranging from 550 to 800° C.

The present disclosure used a method of adding an appropriate additive element to promote the nitridation reaction of the porous body of the aluminum powder. As the appropriate additive element, elements having a low melting point, high volatility, and negligible solubility in aluminum nitride were first considered, while other ingredients were also considered as an additive element.

According to the present disclosure, zinc is considered to be an essential element, the zinc having a low melting point of 419.5° C. and having, with aluminum, a eutectic point at 381° C. According to the equilibrium phase diagram (FIG. 2, Binary Alloy Phase Diagram, Second Edition, plus Updates, version 1.0, 1996, ASM International, OH, USA), zinc forms transient liquid through a reaction with aluminum during heating, and then is dissolved into solid-phase aluminum to form an aluminum solid solution. Also, since zinc has a very low boiling point of 907° C. and very high vapor pressure, dezincification in which zinc evaporates selectively and easily from a solid solution when heat is applied, is caused and aluminum becomes porous, and thus it is expected that a nitridation reaction may be promoted. Also, during a combustion reaction in a thermal explosion mode, zinc evaporates entirely via the dezincification, and thus is not found in a molded body of aluminum nitride. However, when a content of zinc being added is too high, the combustion reaction may be adversely affected, and some residual zinc may be retained in the porous body of aluminum nitride.

In addition, magnesium is also added, magnesium having a lower melting point than aluminum, a low boiling point of 1,091° C., and high vapor pressure. Owing to its high affinity with oxygen, magnesium reacts with aluminum oxide on the surface of aluminum powder to induce local reduction of aluminum oxide through a reaction of $3Mg+4Al_2O_3=3MgAl_2O_4+2Al$, resulting in local exposure of fresh aluminum to a nitrogen gas to facilitate a nitridation reaction. Also, magnesium evaporates during a heating process and forms magnesium nitride by a spontaneous chemical reaction with a nitrogen gas, the magnesium nitride playing a role in the nitridation reaction via a reaction of $Mg_3N_2(s)+2Al(s)=2AlN(s)+3Mg(g)$. The evaporated magnesium formed through such a reaction reacts again with the nitrogen gas to form magnesium nitride. The evaporated magnesium promotes synthesis of aluminum nitride according to a reaction cycle of the nitridation reaction.

In addition, magnesium may be charged separately in a lump form as an oxygen getter for lowering oxygen partial pressure inside a furnace. In this case, magnesium enhances the nitridation of aluminum by lowering the oxygen partial pressure inside the furnace, and may reduce pick-up of oxygen into aluminum nitride. However, when an amount of magnesium to be charged as an alloying element or an oxygen getter is too high, agglomeration or sintering of the aluminum powder in a heating process may be promoted and supply of the nitrogen gas may be inhibited, and thus the nitridation reaction may be suppressed. When the amount of magnesium as an alloying element is too high, even if aluminum nitride is synthesized by the combustion reaction in the thermal explosion mode, some magnesium may be retained as magnesium nitride that is a reaction product with the nitrogen gas, instead of as metal magnesium. The retention of magnesium nitride is not desired because it causes a violent reaction to form magnesium hydroxide ($Mg(OH)_2$) and toxic ammonia gas ($NH_3$) upon contacting moisture, accompanying a large amount of heat. Accordingly, in order to prevent the retention of magnesium nitride inside aluminum nitride after the completion of combustion reaction, the amount of magnesium added to the aluminum powder should be appropriately adjusted.

According to the present disclosure, based on 100 wt % of mixed powder, 0.5 to 8 wt % of zinc and 0.01 to 2 wt % of magnesium may be added.

Also, in order to promote the nitridation reaction, in addition to the above additive elements, powder of an element selected from the group consisting of silicon, copper, calcium, phosphorous, gadolinium, lithium, iron, nickel, cobalt, manganese, silver, chromium, zirconium, strontium, molybdenum, tungsten and alloys thereof may be selectively added.

Based on 100 wt % of the mixed powder, the content of silicon may be 0.01 to 1 wt %, the content of copper may be 0.01 to 1.0 wt %, or the total content of silicon and copper may be 0.02 to 2.0 wt %.

When the aluminum powder and the powder of the above elements are heated under a nitrogen gas atmosphere, the aluminum powder may be agglomerated or sintered owing to local formation of a transient liquid at a eutectic temperature of aluminum with zinc, silicon, copper, or the like. Such a phenomenon may cause closure of a channel for supplying the nitrogen gas into the aluminum powder or the molded body, and thus the nitridation reaction may be adversely affected. Thus to prevent such a problem, the nitridation reaction should be induced keeping the aluminum mixed powder in loosely packed.

According to the present disclosure, in order to prepare loosely packed aluminum mixed powder, a feedstock prepared by pressurized kneading aluminum powder with a large amount of wax-based thermoplastic organic binder is used as a raw material. The organic binder is a wax-based thermoplastic compound, which can be removed by evaporation or thermal degradation during heating. The feedstock containing the organic binder may be used in a granular form after being crushed into granules having a size of about 5 mm, or molded into a certain shape by a powder forming method such as compression molding, powder extrusion, or injection molding.

In order to remove the large amount of organic binder existing among the aluminum powder in the granules or molded body of the feedstock, thermal debinding is performed at a slow heating rate while flowing a nitrogen gas. During this process, a porous debound body is produced and at the same time, an aluminum nitride layer starts to form on the surface of the aluminum powder. Heating may be continued up to a pre-determined nitridation temperature, and reaching the nitridation temperature a violent nitridation reaction may be induced after a certain period of time, and aluminum nitride is produced at a high yield. Before the onset of the violent nitridation reaction, agglomeration or sintering of the aluminum powder needs to be suppressed.

The nitridation reaction accompanying a rapid temperature increase occurred after a certain incubation period at a nitridation temperature as a volume combustion synthesis reaction in a thermal explosion mode. Un-reacted aluminum existing in the core of the aluminum nitride layer experiences melting accompanying a volume expansion, which results in burst of the aluminum nitride. Liquid aluminum droplets leak or erupt due to the burst, and are exposed to the nitrogen gas to cause a reaction. Such a reaction occurs violently, thereby proceeding as a combustion reaction in a thermal explosion mode.

Also, a type and amount of the organic binder introduced to form the porous body are also variables. The organic binder suitable for the present disclosure may be a wax-based thermoplastic organic binder, and in particular, may contain, as a backbone polymer, a polyolefin, such as low density polyethylene or high density polyethylene, or a copolymer-based compound thereof.

An amount of the organic binder added in the feedstock may be expressed in a volume ratio with respect to the mixed powder. According to the present disclosure, the volume ratio of solid powder to the organic binder may be 4:6 to 8:2, for example, 5:5 to 7:3. When the volume ratio of the solid powder to the organic binder is lower or higher than the above ratios, the yield of aluminum nitride may be low.

Further, an inorganic material that does not react with aluminum, such as alumina, silica, zirconia, yttria ($Y_2O_3$), calcium oxide (CaO), aluminum nitride, silicon carbide, born carbide, silicon nitride ($Si_3N_4$), WC, MoC, $TiB_2$, TiC, TiN, h-BN, c-BN, diamond, carbon nanotube, or graphene, does not promote agglomeration of the aluminum powder, contributes to smooth supply of the nitrogen gas to promote nitridation reaction and at the same time, absorbs heat generated during the nitridation reaction. Accordingly, the inorganic material may be used as a moderator to control the nitridation reaction. Here, 0.1 to 50 wt % of the inorganic material may be added based on 100 wt % of the raw mixed powder.

MODE OF DISCLOSURE

Hereinafter, the present disclosure will be described in detail with reference to examples and comparative examples.

Example 1

Aluminum powder (MEP 105, Ecka Granules, Inc. Germany) having an average particle size of about 6 μm was mixed with 4 wt % of zinc powder (ZN-101, Atlantic Equipment Engineers, U.S.A) having an average particle size of 1 to 5 μm, 1 wt % of magnesium powder (Nana AMT Inc., Korea) having an average particle size of −325 mesh (US standard), 0.25 wt % of silicon powder (SI-102, Atlantic Equipment Engineers, U.S.A) having an average particle size of −10 μm, and 0.1 wt % of copper powder (CU-101, Atlantic Equipment Engineers, U.S.A) having an average particle size of 1 to 5 μm. Then, 80.5 g of such mixed powder was kneaded with 14.6 g of a thermoplastic organic binder containing wax and modified polyolefin at 140° C. for 2 hours. After solidification, a feedstock was prepared by crushing the result product into granules having a size of 50 mesh or less.

The granules of the feedstock were charged into a mold pre-heated to 120° C. and then molded under a pressure of about 10 MPa to prepare a molded body in a disc shape having a diameter of 20 mm and a thickness of 4.5 mm. The molded body was placed in an alumina tray and charged into a tube furnace, and a nitrogen gas was flowed at a rate of 0.3 L/min to perform debinding and nitridation treatment. A heating schedule was as follows: heating to 100° C. at 1.7° C./min and then holding for 30 minutes; heating to 300° C. at 1.5° C./min and then holding for 4 hours; heating to 500° C. at 1.0° C./min and then holding for 30 minutes; and heating to 630° C., that is a nitridation temperature, and then holding for 3 hours, followed by cooling to room temperature.

When the nitridation temperature, i.e., 630° C., was maintained for about 1 hour, a drastic and rapid rise of a temperature in the furnace was observed. (FIG. 2)

FIGS. 3 (*a*) and 3 (*b*) show appearances of a specimen in as-molded state and after nitridation at 630° C., respectively. The nitridation-treated specimen showed black and light gray colors, and a linear increase of 6% in diameter, but its original shape was almost retained without any large crack.

An X-ray diffraction experiment was performed on the nitrified specimen, and as shown in FIG. 3 (*a*), only aluminum nitride diffraction peaks were observed. Density of the specimen was a porous state of about 2.0 g/cm$^3$.

A fracture surface of the porous aluminum nitride specimen synthesized as such was examined in a scanning electron microscope, and images thereof are shown in FIG. 5. Many pores were observed on the fracture surface of the specimen (FIG. 5*a*) and at higher magnification (FIG. 5*b*), a mixed crystallite structure including fine aluminum nitride grains having a size of about 0.5 μm or less and, in part, tiny fibrous crystallites having a thickness of about 0.02 μm and a length of about 3 μm was observed.

Comparative Example 1

Only pure aluminum powder was used, and a nitridation temperature was set to 650° C. The same aluminum powder as used in Example 1 (MEP 105, Ecka Granules Inc., Germany) and an organic binder were kneaded at a volume ratio of 65:35 to prepare a feedstock. The feedstock was crushed into −50 mesh granules, which was then charged into a metal mold pre-heated to 120° C., and compression-molded under a pressure of 10 MPa to produce a specimen in a disc shape having a diameter of 20 mm and a thickness of 4.5 mm. The heating schedule used in Example 1 was used, while a nitridation temperature was set 650° C. and a holding time was set to 3 hours. A nitrogen gas was flowed at a rate of 0.3 L/min throughout the heating process.

Under the present experimental conditions, a drastic temperature change similar to that which was clearly observed in the furnace throughout the nitridation in Example 1 was not observed. Result of X-ray diffraction analysis performed on the specimen is shown in FIG. 4*b*. A phase analysis was performed based on the X-ray diffraction result, which showed that a two-phase composite containing about 21 wt % of aluminum nitride and 79 wt % of un-reacted aluminum was synthesized.

Comparative Example 2

An experiment was performed in the same manner as in Example 1, except that a feedstock was prepared by kneading mixed powder and an organic binder at a volume ratio of 65:35, the mixed powder containing only 96 wt % of aluminum powder and 4 wt % of zinc powder based on 100 wt %, and the feedstock was crushed, charged into a mold pre-heated to 120° C., and compression-molded under pressure of 10 MPa to produce a molded body in a disc shape having a diameter of 20 mm and a thickness of about 4.5 mm. Debinding and nitridation treatment were performed using a single heating schedule, while a nitridation temperature and a holding time were set to 610° C. and 3 hours, respectively. At this time, nitrogen gas was flowed at a rate of 0.3 L/min.

Under the present experimental condition, a rapid temperature increase was observed during the nitridation treatment as in Example 1, but X-ray diffraction analysis showed that the molded body consists of about 50 wt % of aluminum nitride and about 50 wt % of un-reacted aluminum (FIG. 4c)

Comparative Example 3

An experiment was performed in the same manner as in Example 1, except that a feedstock was prepared by kneading an organic binder and aluminum powder (AL-101, Atlantic Equipment Engineers, U.S.A.), having a size of −325 mesh (U.S. Standard mesh) at a volume ratio of 65:35, only and a molded body having a diameter of 20 mm and a height of about 4.5 mm was produced, wherein the molded body was debound and nitridation-treated under a nitrogen gas atmosphere. A nitridation temperature was set to 600° C. and the experiment was performed for 3 hours under a nitrogen gas atmosphere.

A rapid temperature increase was observed during the nitridation through a thermocouple inserted in the furnace, and a small crack was observed on the specimen. Density of the specimen is 2.3 g/cm$^3$, and thus was porous. There was almost no change in dimension of specimen before and after the nitridation.

An X-ray diffraction experiment result is shown in FIG. 4d. From the phase analysis, it is observed that the specimen contained about 60 wt % of aluminum nitride and about 40 wt % of un-reacted aluminum.

Comparative Example 4

An experiment was performed in the same manner as in Example 1, except that, metal powder, a 50:50 mixed powder of aluminum powder (MEP 107, Ecka Granules, Germany) having an average particle size of about 6 μm and aluminum powder (AL-101, Atlantic Equipment Engineers, U.S.A.) having a particle diameter of −325 mesh (U.S. Standard mesh) was used, and a nitridation treatment was performed at a nitridation temperature of 630° C. for 2 hours under a nitrogen gas atmosphere. Under such a nitridation experimental condition, a rapid temperature rise was not observed during the nitridation treatment, and the yield of aluminum nitride was as low as about 20 wt %.

Example 2

Experiments were performed in the same manner as in Example 1, except that nitridation temperatures were set to 600° C. and 700° C. which is higher than the melting point of aluminum. At these nitridation temperatures, violent nitridation reactions were observed, accompanying a rapid temperature rise. In both cases, the formation of a single phase of aluminum nitride was observed in the experimental results through X-ray diffraction.

Synthesized aluminum nitride ceramic exhibited partially black and bright gray colors, and the appearance of specimens remained almost unchanged. FIG. 3 (c) shows the appearance of a nitridation-treated specimen. Densities of the two specimens were almost same and about 2.20 g/cm$^3$.

Comparative Example 5

An experiment was performed in the same manner as in Example 1 by using mixed powder containing aluminum powder having an average particle size of about 6 μm (MEP 105, Ecka Granules, Inc. Germany), 4 wt % of zinc powder (ZN-101, Atlantic Equipment Engineers, U.S.A) having an average particle size of 1 to 5 μm, 1 wt % of −325 mesh (US standard) magnesium powder (Nana AMT Inc., Korea), 0.25 wt % of silicon powder (SI-102, Atlantic Equipment Engineers, U.S.A) having an average particle size of −10 μm, 0.1 wt % of copper powder (CU-101, Atlantic Equipment Engineers, U.S.A) having an average particle size of 1-5 μm, except that nitridation treatment was performed at a temperature of 610° C. and an atmospheric gas in which nitrogen gas and hydrogen gas are mixed at 9:1 was used to examine a nitridation reaction result. The nitridation treatment performed for 3 hours, debinding and sintering were performed via a single heating program, and the atmospheric gas was flowed at a rate of 0.3 L/min. The local temperature in the furnace near the specimen barely changed, and according to an X-ray diffraction experiment, formation of aluminum nitride was not observed.

Comparative Example 6

An experiment was performed in the same manner as in Example 1, except that the content of zinc added to aluminum powder was reduced to 2 wt %. A nitridation temperature and time were 630° C. and 3 hours, respectively. Under such experimental conditions, no rapid temperature rise was observed and the phase analysis by X-ray diffraction showed that the yield to aluminum nitride was as low as about 13 wt %.

Example 3

An experiment was performed in the same manner as in Example 1, except that a feedstock was prepared by kneading mixed element powder containing a composition of Al-4 wt % Zn-1 wt % Mg-0.25 wt % Si-0.1 wt % Cu, and an organic binder at a volume ratio of 70:30. The feedstock was crushed into granules having a size of −50 mesh (US standard), charged into a metal mold pre-heated to 120° C., and molded under a pressure of 10 MPa to form a disc-shaped molded body having a diameter of 20 mm and a thickness of about 4.5 mm. Using the same single heating program as in Example 1, debinding was performed, and then nitridation treatment was performed at 630° C. for 3 hours, and nitrogen gas was flowed at a rate of 0.3 L/min throughout the heating process. As a result, a composite material consisting of about 62 wt % of aluminum nitride and about 38 wt % of un-reacted aluminum was synthesized.

Comparative Example 7

An experiment was performed as in Example 1, except that a feedstock was prepared by kneading mixed powder containing 95 wt % of aluminum powder, 4 wt % of zinc powder, and 1 wt % of magnesium with the organic binder at a volume ratio of 75:25. Subsequently, the feedstock was crushed into a small granule having a size of −50 mesh (US standard), charged into a metal mold pre-heated to 120° C., molded under pressure of 10 MPa to form a disc-shaped molded body having a diameter of 20 mm and a thickness of 4.5 mm. The nitridation treatment was performed at 610° C. for 3 hours by using the same single heating program for debinding and nitridation as in Example 1, and nitrogen gas was flowed at a rate of 0.3 L/min.

Under present experimental conditions, a combustion synthetic reaction in a thermal explosion mode accompanying a rapid temperature increase was observed during the nitridation by observing a change of temperature in the furnace, and a porous nitrified body was produced. The phase analysis by an X-ray diffraction experiment showed that a composite consisting of 31 wt % of aluminum nitride and 69 wt % of un-reacted aluminum was produced.

Example 4

A feedstock was prepared in the same manner as in Example 1, except that composite powder consisting of 60 parts by weight of mixed powder containing 95 wt % of aluminum powder, 4 wt % of zinc powder, and 1 wt % of magnesium and 40 parts by weight of boron carbide (BO-301, Atlantic Equipment Engineers, U.S.A.) having an average particle size of ~3 μm and purity of 99.7% was kneaded with the organic binder at a volume ratio of 65:35. Subsequently, the feedstock was crushed into granules having a size of −50 mesh (U.S. standard), charged into a metal mold pre-heated to 120° C., and molded under a pressure of 10 MPa to produce a disc-shaped molded body having a diameter of 20 mm and a thickness of about 4.5 mm. After performing debinding by using the same single heating program as in Example 1, the debound body was nitridation-treated at 590° C. for 3 hours in nitrogen gas flowing at a rate of 0.3 L/min throughout the heating process.

A rapid increase of temperature occurred in the furnace, and according to X-ray diffraction analysis results, it was observed that the nitridation-treated specimen contained aluminum nitride, boron carbide and very small amounts of other unidentified compounds (FIG. 6a). The phase composition was analyzed to be about 63 wt % of aluminum nitride and about 37 wt % of boron carbide.

Example 5

A feedstock was prepared in the same manner as in Example 1, except that composite powder consisting of 90 parts by weight of mixed powder containing 95 wt % of aluminum powder, 4 wt % of zinc powder, and 1 wt % of magnesium and 10 parts by weight of 99.7% pure silicon carbide (Showa Denko K.K., Japan) having an average particle size of about 75 μm was kneaded with the organic binder at a volume ratio of 65:35. Subsequently, the feedstock was crushed into granules having a size of −50 mesh (U.S. Standard mesh size), charged into a metal mold pre-heated to 120° C., and molded under a pressure of 10 MPa to produce a disc-shaped molded body having a diameter of 20 mm and a thickness of about 4.5 mm.

Using the same single heating program as in Example 1, debinding was performed and then nitridation was performed at 610° C. for 3 hours. Nitrogen gas was flowed at a rate of 0.3 L/min throughout the heating process.

A rapid increase of temperature was observed in the furnace, and according to X-ray diffraction analysis results, weak diffraction lines of silicon carbide were observed overlapped with diffraction lines of aluminum nitride, indicating that some of silicon carbide was dissolved to 2H aluminum nitride to form $(AlN)_m(SiC)_n$ (FIG. 6b). Also, the presence of weak diffraction lines of silicon suggested possible formation of a reaction product of silicon and silicon carbide, but the presence of aluminum carbide expected to be formed via a reaction, $4Al+3SiC=Al_4C_3+3Si$, was not confirmed.

Example 6

A feedstock was prepared in the same manner as in Example 1, except that composite powder consisting of 90 parts by weight of mixed powder containing 95 wt % of aluminum powder, 4 wt % of zinc powder, and 1 wt % of magnesium and 10 parts by weight of silicon was kneaded with the organic binder at a volume ratio of 65:35. Subsequently, the feedstock was crushed into small granules having a size of −50 mesh (U.S. Standard). The granules were charged into a metal mold pre-heated to 120° C. and molded under a pressure of 10 MPa to produce a disc-shaped molded body having a diameter of 20 mm and a thickness of 4.5 mm. Unlike Example 1, the disc-shaped molded body was debound at 530° C. for 4 hours, and then nitridation treatment was performed at 680° C. for 3 hours.

Under the present experimental conditions, a rapid temperature change in the furnace was observed. The nitrified specimen exhibited a black color and retained its initial shape, but contained pores and cracks. A phase analysis of the nitrified specimen was performed through X-ray experiments (FIG. 6c). As shown in FIG. 6c, a composite material of aluminum nitride and silicon was synthesized, and, considering the existence of these two phases only, the nitridation-treated body is composed of about 91 wt % of aluminum nitride and about 9 wt % of silicon.

Example 7

A feedstock was prepared in the same manner as in Example 1, except that composite powder consisting of 90 parts by weight of mixed powder containing 95 wt % of aluminum powder, 4 wt % of zinc powder, and 1 wt % of magnesium and 30 parts by weight of silicon nitride ($Si_3N_4$) (SI-501, Atlantic Equipment Engineers, U.S.A.) having an average particle size of 1 to 5 μm and purity of 99.8% was kneaded with the organic binder at a volume ratio of 65:35. Subsequently, the feedstock was crushed into small granules having a size of −50 mesh (U.S. standard), charged into a metal mold pre-heated to 120° C., and molded under pressure of 10 MPa to produce a disc-shaped molded body having a diameter of 20 mm and a thickness of 4.5 mm. The disc-shaped molded body was nitridation-treated at 590° C. for 3 hours, and then an X-ray diffraction experiment was performed on the prepared specimen. Hence the phase composition of the synthesized specimen was identified to be a composite material consisting of about 72.5 wt % of aluminum nitride, about 27 wt % of silicon nitride, and about 0.5 wt % of unidentified phase.

Example 8

A feedstock was prepared in the same manner as in Example 1, except that composite powder consisting of 95 parts by weight of mixed powder containing 95 wt % of aluminum powder, 4 wt % of zinc powder, and 1 wt % of magnesium and 5 parts by weight of yttria ($Y_2O_3$) (product of Sigma-Aldrich, U.S.A) having purity of 99.99% was kneaded with the organic binder at a volume ratio of 65:35 at 140° C. The feedstock was crushed into granules having a size of −50 mesh, charged into a metal mold pre-heated to 120° C., molded under a pressure of 10 MPa to produce a molded body. The molded body was debound according to the heating schedule as used in Example 1, and then the temperature was increased from 630° C. to 800° C. for 2 hours, for nitridation treatment. During the heating process, a combustion reaction in the thermal explosion mode took place and a composite material containing aluminum nitride without un-reacted aluminum was synthesized. In addition, some yttrium-aluminum oxide presumed to be $Y_3Al_5O_{12}$, $Y_4Al_2O_9$, $YAlO_3$, or the like was also present. The reaction product obtained as such was porous and exhibited a dark gray color.

As described above, porous aluminum nitride containing small crystallites and whisker having a size or diameter of about 0.5 µm or less can be prepared by nitridation treatment for synthesizing aluminum nitride from aluminum powder via direct nitridation, and a composite of aluminum nitride-inorganic material can be synthesized. The synthesized composite is porous, and may be used as a ceramic preform to manufacture various composites after infiltration of polymer resin or a molten metal therein.

Alternatively, since a porous body is easily crushable, the porous body may be physically crushed into fine powder using a suitable crushing device, and after particle size classification, the powder may be used as a raw material for production of high density composite sintered body.

The technical challenges of the present disclosure are not limited to the above-mentioned technical challenges. Therefore, it is to be understood that examples and comparative examples described above are illustrative and not restrictive.

The invention claimed is:

1. A method of synthesizing aluminum nitride, the method comprising:
preparing mixed powder containing 0.5 to 8 wt % of zinc powder, 0.01 to 2 wt % of magnesium powder, 0.01 to 1 wt % of silicon powder, 0.01 to 1 wt % of copper powder, and a balanced amount of aluminum powder;
preparing a feedstock of the mixed powder blended and filled with thermoplastic organic binder, by pressured kneading the mixed powder and the thermoplastic organic binder;
forming granules of the feedstock by crushing the feedstock or forming a molded body of the feedstock via a powder molding method; and
debinding the granules or the molded body by heating under a nitrogen gas atmosphere, and then performing direct nitridation between aluminum and a nitrogen gas at a temperature higher than a debinding temperature,
wherein the thermoplastic organic binder contains 80 to 95 wt % of a wax mixture and 20 to 5 wt % of polyolefin or modified polyolefin-based polymer,
wherein the feedstock contains the mixed powder and the thermoplastic organic binder at a volume ratio of 7:3 to 5:5.

2. The method of claim 1, wherein an average diameter of the aluminum powder is 0.01 to 50 µm.

3. The method of claim 2, wherein an average diameter of the aluminum powder is 0.1 to 20 µm.

4. The method of claim 1, wherein an average diameter of the zinc powder, the magnesium powder, the silicon powder, and the copper powder is 0.1 to 50 µm.

5. The method of claim 4, wherein an average diameter of the zinc powder, the magnesium powder, the silicon powder, and the copper powder is 0.5 to 30 µm.

6. The method of claim 1, wherein the debinding is performed at a temperature of 420 to 540° C., and
the direct nitridation is performed at a temperature of 550 to 800° C.

7. The method of claim 1, wherein the debinding and the direct nitridation are performed in one furnace using a single heating schedule.

8. The method of claim 1, wherein a dew point of the nitrogen gas is −55° C. or lower, or a moisture content of the nitrogen gas is 0.002 vol % or less.

* * * * *